Nov. 21, 1961   S. A. PAPPAS   3,009,189
GREASE CONTAINER WITH PASTRY BRUSH UNIT
Filed April 29, 1959
FIG_1
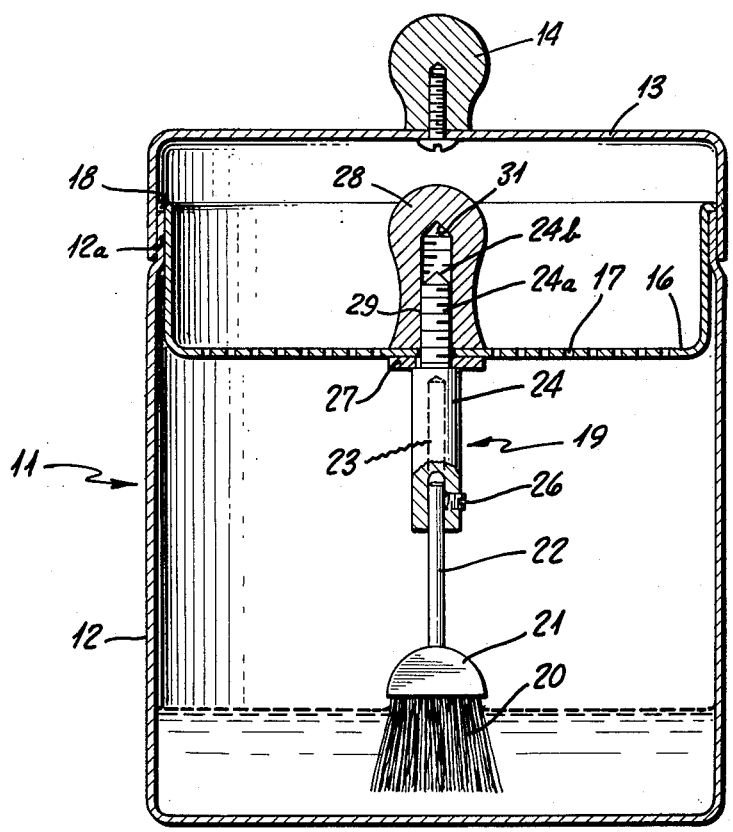
FIG_2
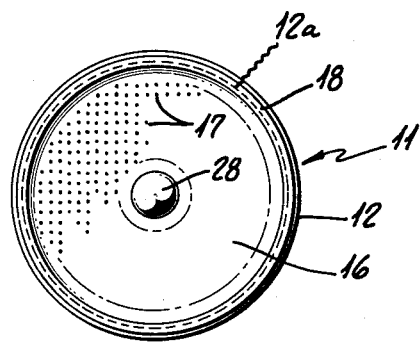
SPILIOS A. PAPPAS
*INVENTOR.*
BY
ATTORNEYS 3,009,189
GREASE CONTAINER WITH PASTRY BRUSH UNIT
Spilios A. Pappas, 1159–A Alabama St.,
San Francisco, Calif.
Filed Apr. 29, 1959, Ser. No. 809,813
5 Claims. (Cl. 15—517)

This invention relates to a grease container with a pastry brush unit.

In cooking and baking it is often desirable to grease certain containers before the cooking or baking operation is commenced. With conventional grease containers, it is difficult to apply grease from the container because before the grease is accessible, the cover of the container and then the strainer must be removed.

In general, it is the object of the present invention to provided a grease container with a pastry brush unit, in which the pastry brush unit is an integral part of the strainer of the grease container.

Another object of the invention is to provide a grease container with a pastry brush unit of the above character in which the depth to which the pastry brush extends can be adjusted.

Another object of the invention is to provide a grease container with a pastry brush unit of the above character in which the pastry brush unit is concealed when the cover is placed on the grease container.

Another object of the invention is to provide a pastry brush unit which can be utilized with conventional grease containers.

Another object of the invention is to provide a pastry brush unit which can be utilized with conventional grease containers.

Another object of the invention is to provide a pastry brush unit of the above character which can be mounted in conventional grease containers without the use of additional tools.

Another object of the invention is to provide a pastry brush unit of the above character in which the handle is mounted above the grease strainer so that it is readily accessible.

Additional objects and features of the invention will appear from the following description in which the preferred embodiment has been set forth in detail in conjunction with the accompanying drawings:

FIGURE 1 is a cross-sectional view of a grease container with a pastry brush unit incorporating the present invention.

FIGURE 2 is a reduced plan view of the grease container with pastry brush unit with the cover removed.

The grease container 11 shown in the drawing is of a conventional type and consists of a cylindrical container 12, which is provided with an inwardly turned top portion 12a and upon which is removably mounted a cover 13 provided with a knob 14. A strainer 16 having a plurality of openings 17 is disposed within the container and is provided with an annular lip 18 which rests on the top side of the portion 12a.

A pastry brush unit 19 is mounted on the strainer 16. The pastry brush unit consists of a brush 20 mounted in a holder 21 of suitable material such as metal. The holder 21 is provided with a stem 22 which is slidably mounted in a hole 23 extending longitudinally of a shaft 24. Suitable means is provided for securing the stem 22 in the shaft 24 and as shown can consist of a screw 26 threaded into the shaft and adapted to engage the stem 22. The upper portion of the shaft 24 is provided with a threaded portion 24a and a pointed portion 24b. A washer 27 is threaded on the portion 24a and serves as a collar.

A handle 28 has its lower end provided with a hole 29 terminating in a point 31. The hole is tapped so that the handle can be threaded unto the threaded portion 24a of the shaft 24 to firmly secure the pastry brush unit to the container 16 as shown.

Operation and use of the grease container with the pastry brush unit may now be briefly described as follows: With the pastry brush unit incorporated in the grease container, it is readily apparent that the pastry brush unit can be utilized merely by lifting the cover 14 and raising the pastry brush by grasping the handle 28, and applying the grease from the container 12 by use of the brush 20 to the utensil being utilized for cooking or baking.

As additional grease is poured into the container, the depth to which the brush 19 extends into the container can be adjusted by the screw 26. Since the pastry brush unit forms an integral part of the grease container, it is always covered and ready for use.

It is apparent that the pastry brush unit can be sold as a separate item for incorporation in conventional grease containers. By utilizing the point 24b on the shaft 24, a hole can be punctured in the strainer and the threaded portion of the shaft forced through the hole so that the handle 28 can be threaded onto the portion 24a. Thus, a housewife can incorporate the pastry brush in her grease container without the use of additional tools or the like. Since the brush is continuously suspended within the container, there is no opportunity for the bristles of the brush to become distorted.

I claim:

1. In the combination of a grease container with a pastry brush unit, a container for holding grease, a removable strainer mounted in the container and normally extending in a horizontal plane, a vertically depending brush, means for securing the brush to the strainer, a handle mounted on the strainer and extending upwardly from the same, and a removable cover mounted on the container and enclosing the strainer and pastry brush unit.

2. In a combination of a grease container with a pastry brush unit, a container for holding grease, a removable strainer mounted in the container and lying in a horizontal plane, a brush, means for securing the brush to the strainer so that the brush depends vertically therefrom, said means for securing said brush to the strainer including means for adjusting the depth to which the brush extends into the container, a handle mounted on the strainer, and a removable cover mounted on the container and enclosing the strainer and pastry brush unit.

3. In the combination of a grease container with a pastry brush unit, a container for holding grease, a substantially horizontal strainer disposed within said container and supported by the side walls of the container, means for securing the brush to the strainer so that the brush depends vertically from the strainer, a handle mounted on the strainer to facilitate the removal of the strainer and the brush as a unit, and a removable cover for the container enclosing the strainer and the pastry brush unit.

4. A combination as in claim 3 wherein said means for securing the brush to the strainer comprises a shaft, a threaded portion on one end of said shaft and extending through the strainer, said handle being threaded on said threaded portion, said shaft being provided with a bore extending longitudinally of the shaft, a stem slidably mounted in said bore and secured to said brush, and means for releasably retaining said stem in a predetermined position in said bore.

5. A pastry brush unit comprising a brush, a shaft, a bore in said shaft extending longitudinally of the shaft and opening into one end of the shaft, a stem secured to said brush and slidably mounted in said bore, means mounted in said shaft to hold the stem in a predetermined position in said bore, the end of said shaft remote from the brush being provided with a threaded portion and a pointed end portion, and a handle threaded on the threaded portion of the shaft, said handle having a recess accommodating the pointed end portion of the shaft.

References Cited in the file of this patent

UNITED STATES PATENTS

| | | |
|---|---|---|
| 847,370 | Ritz | Mar. 19, 1907 |
| 1,098,390 | Lonskey | June 2, 1914 |
| 2,654,110 | Auten | Oct. 6, 1953 |

FOREIGN PATENTS

| | | |
|---|---|---|
| 75,481 | Norway | Aug. 15, 1949 |